United States Patent
Kimura

(10) Patent No.: US 11,825,049 B2
(45) Date of Patent: Nov. 21, 2023

(54) IMAGE-READING DEVICE

(71) Applicant: KYOCERA Document Solutions Inc., Osaka (JP)

(72) Inventor: Shinichi Kimura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/005,797

(22) PCT Filed: Jul. 12, 2021

(86) PCT No.: PCT/JP2021/026132
§ 371 (c)(1),
(2) Date: Jan. 17, 2023

(87) PCT Pub. No.: WO2022/019163
PCT Pub. Date: Jan. 27, 2022

(65) Prior Publication Data
US 2023/0283728 A1 Sep. 7, 2023

(30) Foreign Application Priority Data
Jul. 21, 2020 (JP) .................. 2020-124555

(51) Int. Cl.
*H04N 1/00* (2006.01)
*H04N 1/12* (2006.01)

(52) U.S. Cl.
CPC ..... *H04N 1/00822* (2013.01); *H04N 1/00411* (2013.01); *H04N 1/00811* (2013.01); *H04N 1/00824* (2013.01); *H04N 1/1215* (2013.01)

(58) Field of Classification Search
None
See application file for complete search history.

(56) References Cited

U.S. PATENT DOCUMENTS

| | | | |
|---|---|---|---|
| 2004/0223796 A1* | 11/2004 | Iwata | G03G 15/602 399/367 |
| 2014/0153070 A1* | 6/2014 | Harada | H04N 1/00013 358/498 |
| 2014/0347683 A1* | 11/2014 | Nakayama | B65H 5/26 358/1.12 |
| 2021/0326080 A1* | 10/2021 | Inoue | H04N 1/0044 |

FOREIGN PATENT DOCUMENTS

JP 2013-052929 A 3/2013

* cited by examiner

Primary Examiner — Miya J Cato
(74) Attorney, Agent, or Firm — Stein IP LLC

(57) ABSTRACT

A conveying path for a document (D) includes a first conveying path (R1) that turns back midway, and a second conveying path (R2) that does not turn back midway. When the first conveying path (R1) is used, a first side is read and the document (D) is discharged with the first side facing downward. When the second conveying path (R2) is used, a second side is read and the document (D) is discharged with the second side facing downward. When the second conveying path (R2) is used, a warning message (MS1) is displayed.

5 Claims, 11 Drawing Sheets

IMAGE-READING DEVICE

CROSS-REFERENCE TO RELATED APPLICATIONS

This application is a national stage of International Application No. PCT/JP2021/026132, filed Jul. 12, 2021, which claims the benefit of Japanese Application No. 2020-124555, filed Jul. 21, 2020, in the Japanese Patent Office, the disclosures of which are incorporated herein by reference.

TECHNICAL FIELD

The present invention relates to an image-reading device that reads a document.

BACKGROUND ART

Conventionally, there have been know image-reading devices capable of executing a job of reading a document under conveyance. An example of such image-reading devices is disclosed in Patent Document 1 identified below.

The image-reading device disclosed in Patent Document 1 includes a sheet feed tray on which a document is set. In a case where a plurality of sheets of a document are set on the sheet feed tray, the sheets of the document are fed and conveyed sequentially one by one starting from the uppermost sheet.

The image-reading device disclosed in Patent Document 1 includes two document-conveying paths. A document sheet conveyed along one conveying path is turned upside down after being fed, and discharged onto a sheet discharge tray for a U-turn path. A document sheet conveyed along the other conveying path is discharged onto a sheet discharge tray for a straight path, without being turned upside down.

CITATION LIST

Patent Literature

Patent Documents 1: Japanese Unexamined Patent Application Publication No. 2013-52929

SUMMARY OF INVENTION

Technical Problem

In a case of reading a plurality of sheets of a document with the image-reading device according to Patent Document 1, a user sets the plurality of sheets of the document (a document stack) in the sheet feed tray. Generally, a plurality of sheets of a document are set in the order that the user desires (for example, in the order of page numbers).

In the case of reading a plurality sheets of a document, when the conveying path through which the document sheets are turned upside down is used, the document stack discharged onto the sheet discharge tray is maintained in the same state as at the time of its setting on the sheet feed tray.

On the other hand, in the case of reading a plurality of sheets of a document, when the conveying path through which the document sheets are not turned upside down is used, the document stack discharged onto the sheet discharge tray is not in the same state as at the time of its setting on the sheet feed tray. In this case, after the reading of the plurality of sheets of the document, there needs to be performed, for example, an operation of rearranging the plurality of sheets of the document taken out of the sheet discharge tray, which is troublesome and inconvenient to the user.

The present invention has been made to solve the above problem, and an object thereof is to provide an image-reading device capable of improving convenience in reading a plurality of sheets of a document with a structure that includes a conveying path from which a fed document sheet (a document sheet to be read) is discharged upside down and a conveying path from which a fed document sheet is discharged without being turned upside down.

Solution to Problem

To achieve the above object, according to one aspect of the present invention, an image-reading device includes an operation panel that accepts a setting for a reading job of reading a document to generate image data, a document conveying unit that has a set portion on which a job document to be read in the reading job is set, and that feeds and conveys the job document from the set portion, a first reading portion that reads the job document under conveyance at a first position, a second reading portion that reads the job document under conveyance at a second position, and a control portion that controls the reading job based on a setting for the reading job accepted by the operation panel. Here, a conveying path for the job document includes a first conveying path that extends from one side via the first position toward the other side, turning back midway toward the one side to pass the second position, and a second conveying path that, without turning back midway, passes a predetermined reading position, which is one of the first position and the second position. When a plurality of sheets of the job document are set on the set portion, the document conveying unit feeds the plurality of sheets of the job document sequentially one by one starting from an uppermost sheet of the job document. When a setting has been made such that the first conveying path is to be used in the reading job in which a single side of the job document is read, the second reading portion reads a first side of two sides of the job document, the first side facing upward in a state where the job document is set on the set portion. The document conveying unit discharges the job document with the first side facing downward. When a setting has been made such that the second conveying path is to be used in the reading job in which a single side of the job document is read, a predetermined reading portion that performs reading at the predetermined reading position of the first reading position and the second reading position reads a second side of the two sides of the job document, the second side facing downward in the state where the job document is set on the set portion. The document conveying unit discharges the job document with the second side facing downward. When a setting has been made such that the second conveying path is to be used, the control portion, before executing the reading job, causes the operation panel to display a warning message regarding a page order of the job document after the job document is discharged.

Advantageous Effects of Invention

According to the present invention, it is possible to improve convenience in reading a plurality of sheets of a document.

DESCRIPTION OF EMBODIMENTS

<Structure of Multifunction Peripheral> 1

Figure 1:
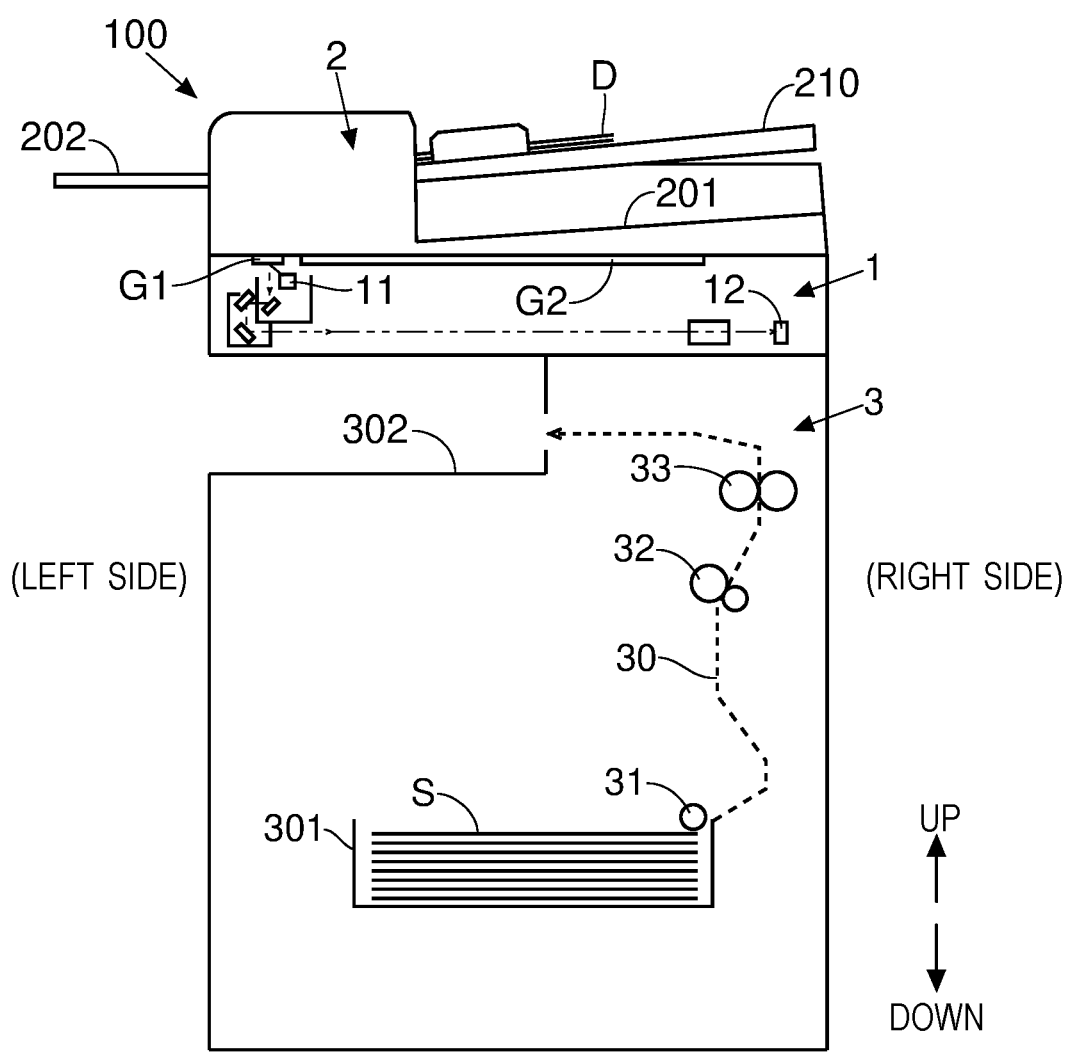
FIG. 1 is a schematic diagram of a multifunction peripheral according to an embodiment of the present invention.

As shown in FIG. 1, a multifunction peripheral 100 (which corresponds to an "image-reading device") according to the present embodiment includes a reading portion 1. The reading portion 1 reads a document D.

The reading portion 1 includes a light source 11 and an image sensor 12. The light source 11 irradiates the document D with light. The image sensor 12 receives light reflected from the document D and photoelectrically converts the light. The light source 11 and the image sensor 12 are disposed inside a housing of the reading portion 1.

The housing of the reading portion 1 has a contact glass G1 and a contact glass G2 attached to an upper surface thereof. The contact glass G1 is used in a conveyed-document reading job. The contact glass G2 is used in a placed-document reading job.

The multifunction peripheral 100 includes a document conveying unit 2. The document conveying unit 2 is rotatably attached to the housing of the reading portion 1. The document conveying unit 2 includes a first document tray 210 and a first discharge tray 201. The document conveying unit 2 further includes a second discharge tray 202.

The first document tray 210 is located on a right side (one side) as seen from a front of the multifunction peripheral 100. The first discharge tray 201 is located on the right side as seen from the front of the multifunction peripheral 100, below the first document tray 210. The second discharge tray 202 is located on a left side (the other side that is opposite to the one side) as seen from the front of the multifunction peripheral 100.

Figure 2:
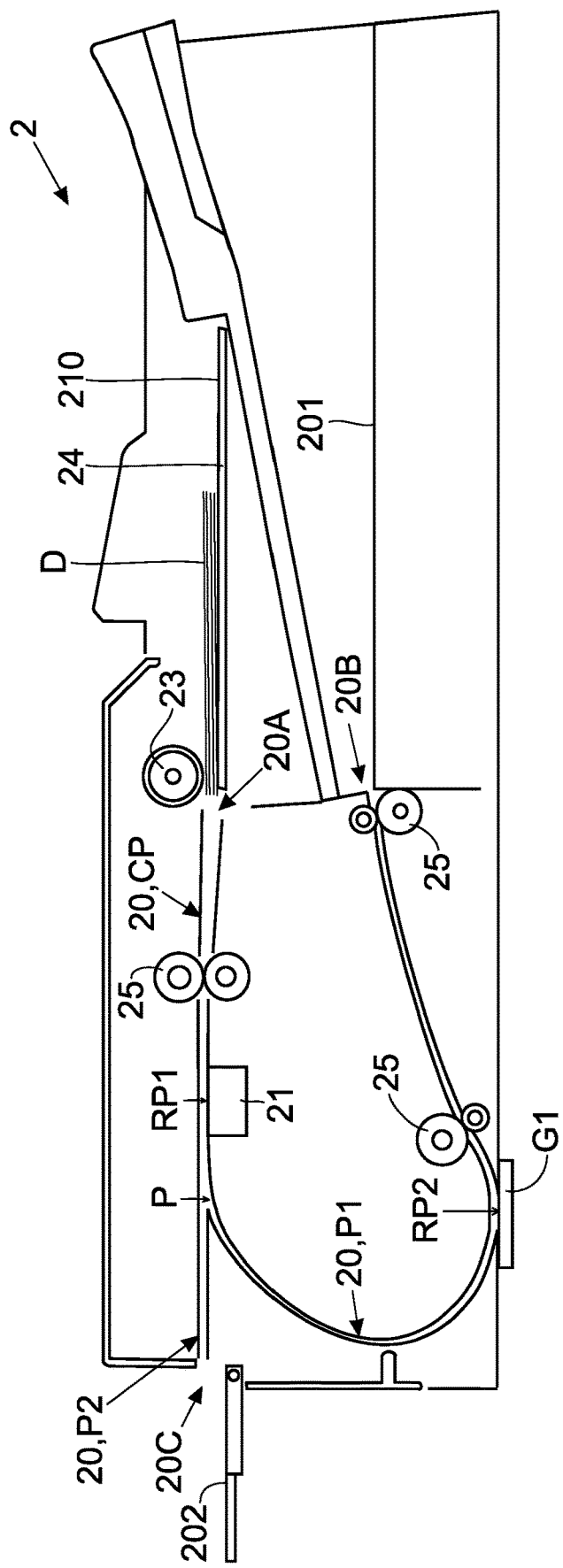
FIG. 2 is a schematic diagram of a document conveying unit according to the embodiment of the present invention.

As shown in FIG. 2, the document conveying unit 2 includes a document conveying path 20. The document conveying path 20 guides the conveyance of the document D to be read in a conveyed-document reading job. The document D to be read in a conveyed-document reading job is set in the first document tray 210. The document conveying unit 2 feeds the document D from the first document tray 210 into the document conveying path 20 for conveyance. That is, the first document tray 210 corresponds to a "set portion". In a case where a plurality of sheets of the document D are set on the first document tray 210, the document conveying unit 2 feeds the plurality of sheets of the document D on the first document tray 210 into the document conveying path 20 sequentially one by one starting from an uppermost sheet of the document D. The document conveying unit 2 discharge the document D onto either the first discharge tray 201 or the second discharge tray 202.

In the following description, a sheet feed port through which to feed the document D from the first document tray 210 into the document conveying path 20 will be denoted with a sign 20A. Further, a sheet discharge port through which to discharge the document D from the document conveying path 20 onto the first discharge tray 201 will be denoted with a sign 20B. A discharge port through which to discharge the document D from the document conveying path 20 onto the second discharge tray 202 will be denoted with a sign 20C.

The second discharge tray 202 is rotatably (openably and closably) attached to the housing of the document conveying unit 2. The second discharge tray 202 rotates between an opening position (the position shown in FIG. 2) and a closing position (unillustrated). When the second discharge tray 202 is at the opening position, the discharge port 20C is opened. And the second discharge tray 202 is closed (rotated from the opening position to the closing position) to thereby close the discharge port 20C.

Figure 3:
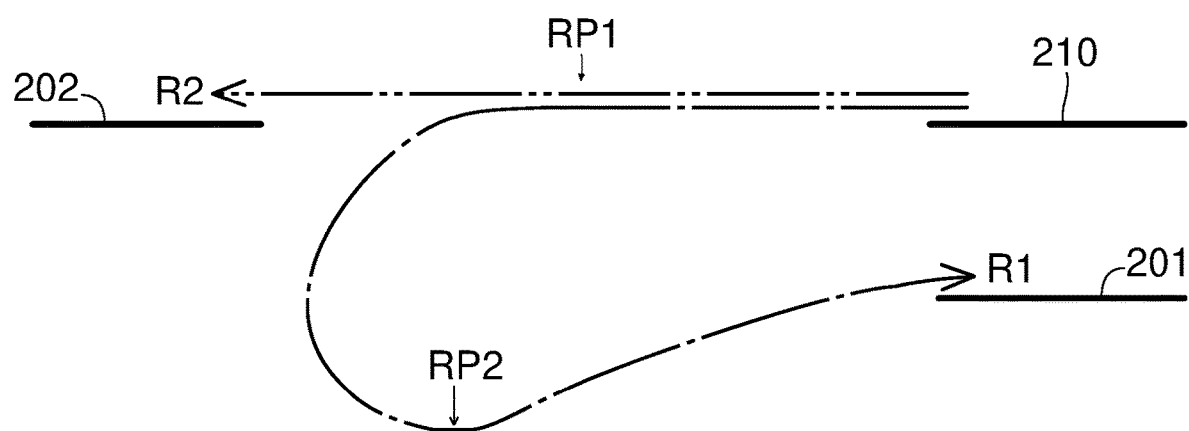
FIG. 3 is a diagram showing a conveying path for a document conveyed by the document conveying unit according to the embodiment of the present invention.

There are two conveying paths for the document D which is conveyed by the document conveying unit 2. The document conveying unit 2 conveys the document D along either one of a first conveying path R1 (see FIG. 3) and a second conveying path R2 (see FIG. 3). In FIG. 3, the first conveying path R1 is indicated by a dashed-dotted line, and the second conveying path R2 is indicated by a dashed-and-double-dotted line. In FIG. 2, neither the first conveying path R1 nor the second conveying path R2 is illustrated.

The first conveying path R1 starts from the sheet feed port 20A of the document conveying path 20, and ends at the discharge port 20B of the document conveying path 20. The first conveying path R1 extends from a right side (one side) of the document conveying unit 2, via a first position RP1, toward a left side (an other side) of the document conveying unit 2, and turns back midway toward the right side to pass a second position RP2. That is, the first conveying path R1 is, in part thereof, curved substantially in a U-shape. In a case where the first conveying path R1 is used, the document conveying unit 2 feeds the document D from the first document tray 210 into the document conveying path 20, and discharges the document D onto the first discharge tray 201.

The second conveying path R2 starts from the sheet feed port 20A of the document conveying path 20, and ends at the discharge port 20C of the document conveying path 20. The first conveying path R1 and the second conveying path R2 both starts from the same starting point. The second conveying path R2 extends from the right side (the one side) of the document conveying unit 2, via the first position RP1, toward the left side (the other side), without turning back midway. The second conveying path R2, unlike the first conveying path R1, extends straight from the right side toward the left side. In this structure, the first position RP1 corresponds to a "predetermined reading position". In a case where the second conveying path R2 is used, the document conveying unit 2 feeds the document D from the first document tray 210 into the document conveying path 20, and discharges the document D onto the second discharge tray 202.

As shown in FIG. 2, the document conveying path 20 has a common part CP. The common part CP is a part extending from the sheet feed port 20A to a branching position P in the document conveying path 20. The document conveying path 20 branches at the branching position P into a first part P1 and a second part P2. The first part P1 extends from the branching position P to the first discharge tray 201. The second part P2 extends from the branching position P to the second discharge tray 202. The conveying path for conveying the document D from the first document tray 210, via the common part CP and the first part P1, to the first discharge tray 201 is the first conveying path R1. The conveying path for conveying the document D from the first document tray 210, via the common part CP and the second part P2, to the second discharge tray 202 is the second conveying path R2.

At the first position RP1, a reading sensor 21 is disposed. The reading sensor 21 is a contact image sensor (CIS). The reading sensor 21 performs reading at the first position RP1. That is, the reading sensor 21 corresponds to a "first reading portion" and a "predetermined reading portion".

The second position RP2 is set on the contact glass G1. At the second position RP2, reading is performed by the reading portion 1. That is, the reading portion 1 corresponds to a "second reading portion".

The document conveying unit 2 further includes a sheet feed roller 23. The sheet feed roller 23 is disposed at the sheet feed port 20A of the document conveying path 20. The sheet feed roller 23 comes into contact with the document D set in the first document tray 210, and rotates in that state. Thereby, the document D is fed from the first document tray 210 into the document conveying path 20.

The first document tray 210 includes a lift plate 24. In the first document tray 210, the document D is placed on the lift plate 24. The lift plate 24 has a rotation fulcrum at an end part thereof on one side (a right side) in a sheet feeding direction. The lift plate 24 rotates in such a manner as to vertically shake an end part thereof on the other side (a left side) in the sheet feeding direction. The lift plate 24 rises to bring the document D on the first document tray 210 into contact with the sheet feed roller 23.

Along the document conveying path 20, a plurality of conveying-roller pairs 25 are disposed. Each of the conveying-roller pairs 25 includes a drive roller and a driven roller. The drive roller and the driven roller are in pressure contact with each other to form a conveying nip. Each of the conveying-roller pairs 25 rotates to thereby convey the document D entered into the conveying nip.

In a case where a job to be executed is a conveyed-document reading job, the document D is set on the first document tray 210. The document conveying unit 2 feeds the document D on the first document tray 210 into the document conveying path 20 for conveyance. In the conveyed-document reading jobs, reading is performed with respect to the document D under conveyance, and image data of the document D is generated.

In a case where a job to be executed is a placed-document reading job, the document D is set on the contact glass G2. In a placed-document reading job, reading is performed with respect to the document D on the contact glass G2 by the reading portion 1, and image data of the document D is generated.

A conveyed-document reading job is executed in either one of a first mode and a second mode. The first mode is a mode in which the first conveying path R1 is used. The second mode is a mode in which the second conveying path R2 is used.

When a conveyed-document reading job is executed in the first mode, the document conveying unit 2 feeds the document D set on the first document tray 210, and conveys the document D along the first conveying path R1.

In a case of reading a single side of the document D in a conveyed-document reading job in the first mode, the reading portion 1 reads a first side of two sides of the document D when the document D under conveyance passes the second position RP2. The first side of the document D is a side that faces upward in a state of being set on the first document tray 210.

In a case of reading both of the two sides of the document D in a conveyed-document reading job in the first mode, the reading portion 1 reads the first side of the document D at the second position RP2. The reading sensor 21 reads a second side of the two sides of the document D when the document D under conveyance passes the first position RP1, the second side being a side opposite to the first side. The second side of the document D is a side that faces downward in the state of being set on the first document tray 210.

In a conveyed-document reading job in the first mode, the document conveying unit 2 discharges the document D having been read onto the first discharge tray 201. At this time, the document conveying unit 2 discharges the document D with the first side of the document D facing downward (with the second side facing upward). That is, the document conveying unit 2, after feeding the document D, turns the document D upside down, and then discharges the document D.

When a conveyed-document reading job is executed in the second mode, the document conveying unit 2 feeds the document D set on the first document tray 210, and conveys the document D along the second conveying path R2.

In a case of reading a single side of the document D in a conveyed-document reading job in the second mode, the reading sensor 21 reads the second side of the document D when the document D under conveyance passes the first position RP1. Note that, in a conveyed-document reading job in the second mode, double-sided reading of the document D cannot be executed.

In a conveyed-document reading job in the second mode, the document conveying unit 2 discharges the document D having been read onto the second discharge tray 202. At this time, the document conveying unit 2 discharges the document D with the second side of the document D facing downward (with the first side facing upward). That is, the document conveying unit 2, after feeding the document D, discharges the document D without turning the document D upside down.

Note that in a conveyed-document reading job (single-sided reading) in the first mode, reading of the first side of the document D is performed. Thus, when setting the document D on the first document tray 210, it is preferable to set the document D with a reading-target side thereof facing upward. On the other hand, in a conveyed-document reading job in the second mode, reading of the second side of the document D is performed. Accordingly, when setting the document D on the first document tray 210, it is necessary to set the document D with the reading-target side thereof facing downward.

A user freely selects the mode of a conveyed-document reading job. For example, a default mode is the first mode. Normally, in a case where the document D is a document printed on plain paper, the user selects the first mode.

In a case where the document D is of a specific type, which is not plain paper, the second mode is recommended. Thus, in the case where the document D is of the specific type, the user selects the second mode. Examples of the document D of the specific type include a thick-paper document, a plastic card, a business card, a coated-paper document, etc. That is, the document D of the specific type is thicker and stiffer than the document D of the plain paper type. Thus, in the case where the document D is of the specific type, the second mode is recommended in which the document D can be conveyed without being bent.

Referring back to FIG. 1, the multifunction peripheral 100 includes a printing portion 3. The printing portion 3 conveys a sheet S along a sheet conveying path 30 (indicated by a dashed line in FIG. 1). Then, the printing portion 3 prints an image on the sheet S under conveyance. For example, the printing portion 3 forms, as an image for printing on the sheet S, an image based on image data obtained through a reading job.

The printing portion 3 includes a sheet feed portion 31. The sheet S to be used in printing is stored in a sheet cassette 301. The sheet feed portion 31 feeds the sheet S from the sheet cassette 301 into the sheet conveying path 30.

The printing portion 3 includes a transfer portion 32. The transfer portion 32 includes a photosensitive drum and a transfer roller. The photosensitive drum carries a toner image on a circumferential surface thereof. The transfer roller is in pressure contact with the photosensitive drum to form a transfer nip between the photosensitive drum and itself. The transfer portion 32 transfers the toner image onto the sheet S while conveying the sheet S entered into the transfer nip.

Although not illustrated, the printing portion 3 further includes a charging device, an exposure device, and a developing device. The charging device charges the circumferential surface of the photosensitive drum. The exposure device forms an electrostatic latent image on the circumferential surface of the photosensitive drum. The developing device develops the electrostatic latent image formed on the circumferential surface of the photosensitive drum into a toner image.

The printing portion 3 further includes a fixing portion 33. The fixing portion 33 includes a heating roller and a pressure roller. The heating roller incorporates a heater. The pressure roller is in pressure contact with the heating roller to form a fixing nip between the heating roller and itself. The fixing portion 33 fixes the toner image onto the sheet S while conveying the sheet S entered into the fixing nip. The sheet S having been printed is discharged onto a sheet discharge tray 302.

Figure 4:
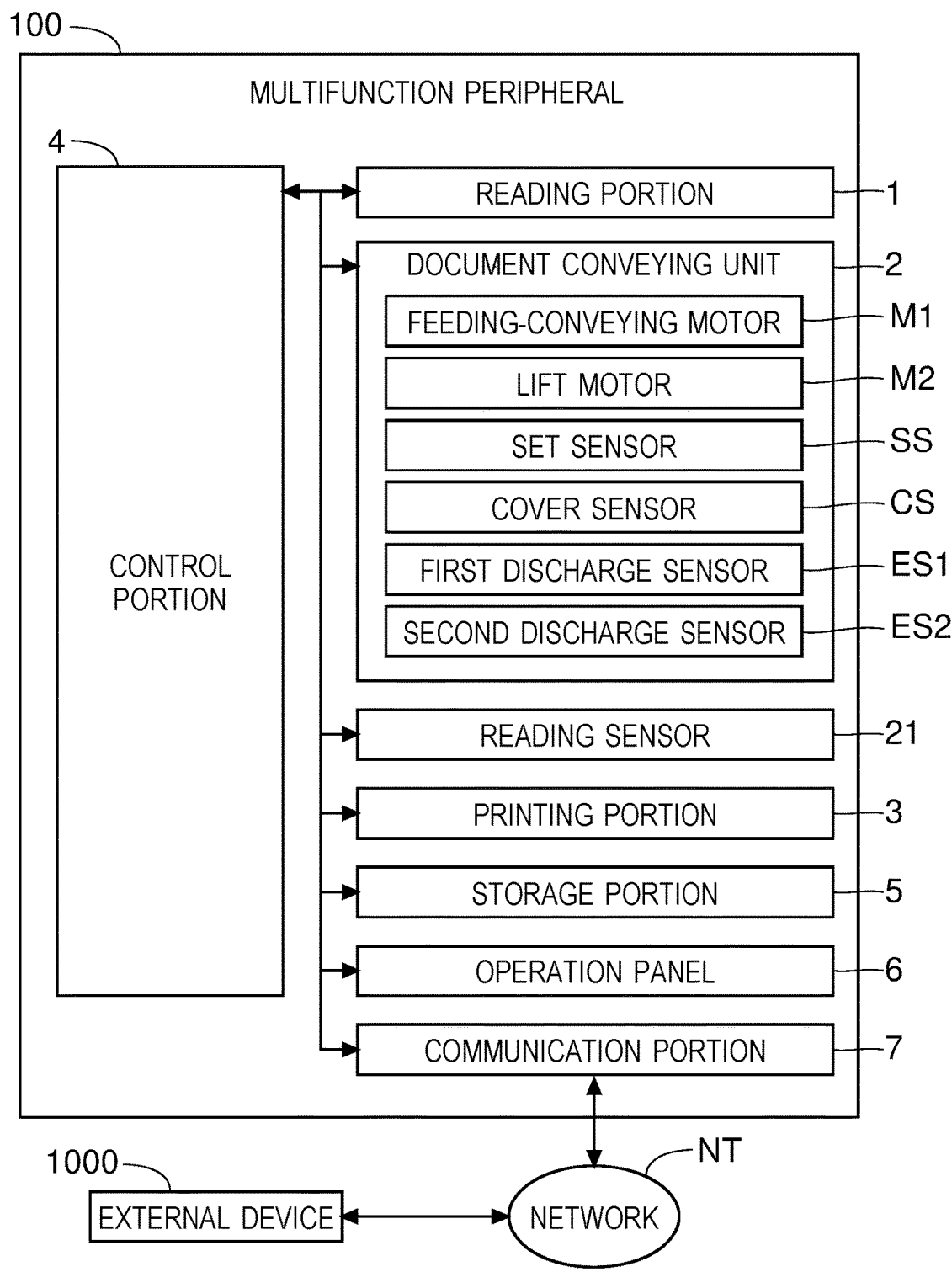
FIG. 4 is a block diagram of the multifunction peripheral according to the embodiment of the present invention.

As shown in FIG. 4, the multifunction peripheral 100 further includes a control portion 4 and a storage portion 5. The control portion 4 includes a CPU. The storage portion 5 includes storage devices such as a ROM, a RAM, an HDD, and the like. The control portion 4 controls jobs executed in the multifunction peripheral 100, such as a reading job, a printing job, and the like.

The control portion 4 controls the operation of reading the document performed by the reading portion 1. The control portion 4 also controls the operation of conveying the document D performed by the document conveying unit 2. That is, the control portion 4 controls a feeding-conveying motor M1 that rotates various roller members, including the sheet feed roller 23, that each have a role in conveying the document D. The control portion 4 controls a lift motor M2 that lifts and lowers the lift plate 24. The control portion 4 controls the operation of reading the document D performed by the reading sensor 21.

The control portion 4 has a set sensor SS connected thereto. The set sensor SS is disposed at the first document tray 210. The set sensor SS outputs different values depending on whether or not the document D exists on the first document tray 210. Based on an output of the set sensor SS, the control portion 4 detects whether the document D is set on the first document tray 210 (whether the document D is left on the first document tray 210).

The control portion 4 further has a cover sensor CS connected thereto. The cover sensor CS outputs different values depending on whether the second discharge tray 202 is at the opening position or at the closing position. The cover sensor CS is, for example, a transmissive photosensor that has a light emitting portion and a light receiving portion. When the second discharge tray 202 is at the opening position, a detection piece provided on the second discharge tray 202 blocks (or unblocks) an optical path between the light emitting element and the light receiving element of the cover sensor CS. On the other hand, when the second discharge tray 202 is at the closed position, the detection piece of the second discharge tray 202 unblocks (or blocks) the optical path between the light emitting element and the light receiving element of the cover sensor CS.

Based on an output of the cover sensor CS, control portion 4 detects whether the second discharge tray 202 is at the opening position or at the closing position (an open/closed state of the second discharge tray 202). That is, based on the output of the cover sensor CS, the control portion 4 detects whether or not the discharge port 20C of the document conveying path 20 is closed by the second discharge tray 202.

The control portion 4 further has a first discharge sensor ES1 connected thereto. The first discharge sensor ES1 outputs different values depending on whether or not the document D exists on the first discharge tray 201. Based on the output of the first discharge sensor ES1, the control portion 4 detects whether or not the document D has been discharged onto the first discharge tray 201 (whether or not the document D is left on the first discharge tray 201).

The control portion 4 further has a second discharge sensor ES2 connected thereto. The second discharge sensor ES2 output different values depending on whether or not the document D exists on the second discharge tray 202. Based on the output of the second discharge sensor ES2, the control portion 4 detects whether or not the document D has been discharged onto the second discharge tray 202 (whether or not the document D is left on the second discharge tray 202).

The multifunction peripheral 100 includes an operation panel 6. The operation panel 6 includes a touch screen. The touch screen displays a screen having software buttons arranged thereon, and accepts a touch operation with respect to the displayed screen from the user. The operation panel 6 includes a plurality of hardware buttons. The plurality of hardware buttons include a start button that accepts a job execution instruction from the user.

The operation panel 6 is connected to the control portion 4. The control portion 4 controls a display operation of the operation panel 6. Furthermore, the control portion 4 detects an operation performed on the operation panel 6. On the operation panel 6 accepting an instruction to execute a job, the control portion 4 executes the job. In a case where the job of which execution has been instructed is a conveyed-document reading job, the control portion 4 causes the document conveying unit 2 to convey the document D to be read in the conveyed-document reading job (that is, the document D set on the first document tray 210).

The multifunction peripheral 100 includes a communication portion 7. The communication portion 7 includes a communication circuit. The communication portion 7 is communicably connected to an external device 1000 via a network NT. The external device 1000 is a personal computer (a user terminal), a server, a facsimile machine, or the like.

The communication portion 7 is connected to the control portion 4. The control portion 4 uses the communication portion 7 to transmit and receive data to and from the external device 1000. For example, it is possible to transmit image data of the document D obtained in a reading job to the external device 1000.

<Setting of Reading Job>

The operation panel 6 accepts settings regarding a conveyed-document reading job from the user. Settings are accepted of various items such as reading resolution, reading size, on/off of double-sided reading, etc.

Here, the operation panel 6 accepts, as a setting regarding a conveyed-document reading job, a setting (path setting) regarding which of the first conveying path R1 and the second conveying path R2 is to be used in the conveyed-document reading job. A default conveying path is the first conveying path R1.

The operation panel 6 also accepts, as a setting regarding a conveyed-document reading job, a setting (a type setting) regarding what type of the document D is to be read in the conveyed-document reading job. For example, a plurality of document types, such as regular paper, thick paper, plastic card, business card, coated paper, and the like, are each associated with a prescribed thickness (basis weight). In the setting of document type, any of the plurality of types is set as the target of reading. A default document type is plain paper.

<Display of Warning Message>

In a case where the document D to be read in a conveyed-document reading job includes a plurality of sheets, the user arranges the plurality of sheets of the document D such that their reading-target sides all face a same direction (upward/downward). Further, the user arranges the plurality of sheets of the document D in the order of page numbers. Then, the user sets, on the first document tray 210, a stack of the plurality of sheets of the document D that he or she has arranged such that their reading-target sides all face the same direction and in the order of page numbers.

Figure 5:
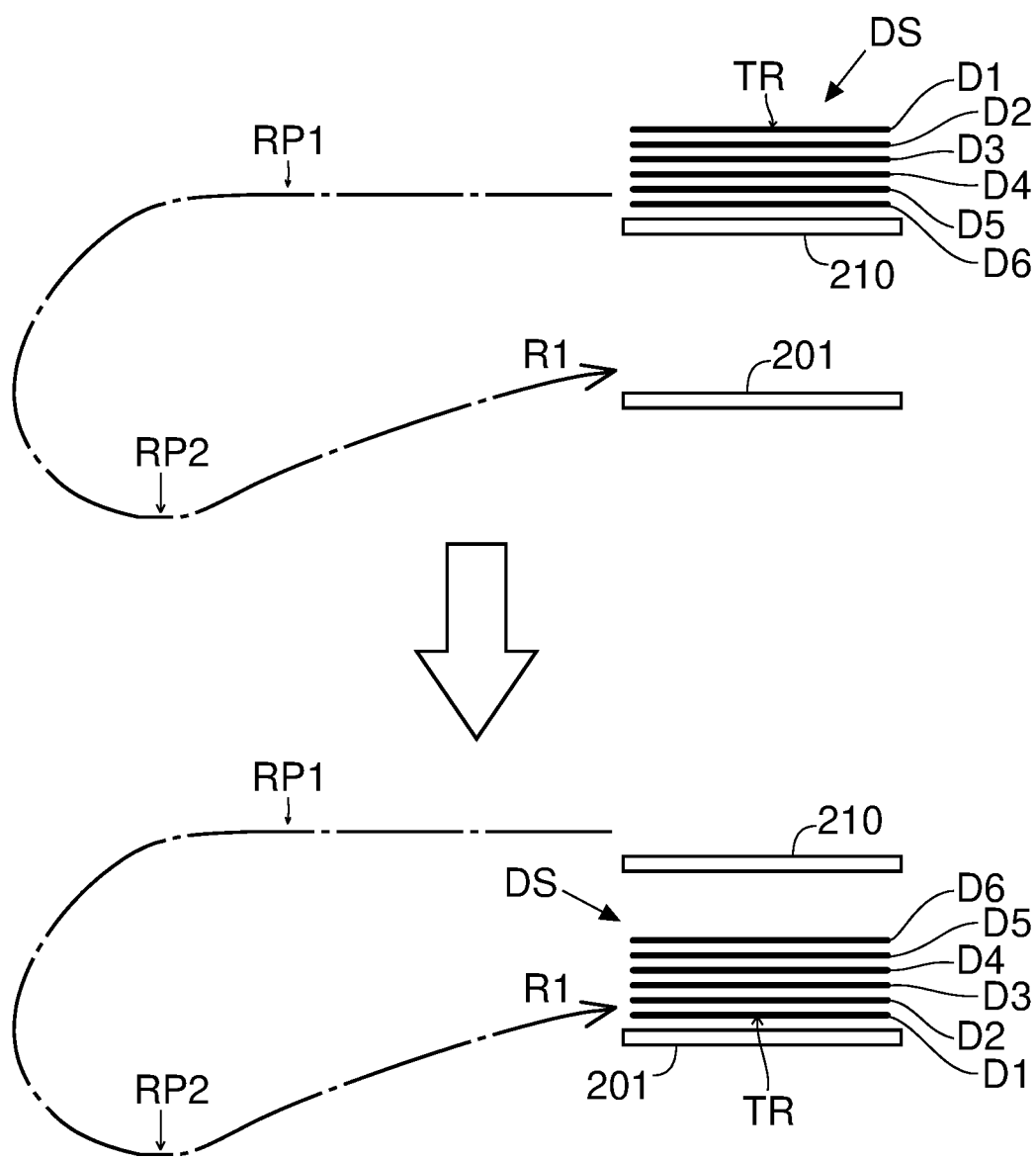
FIG. 5 is a diagram showing a state of a plurality of sheets of a document set in the document conveying unit according to the embodiment of the present invention and a state of the plurality of sheets of the document discharged from the document conveying unit (in a case where a first conveying path is used).
Figure 6:
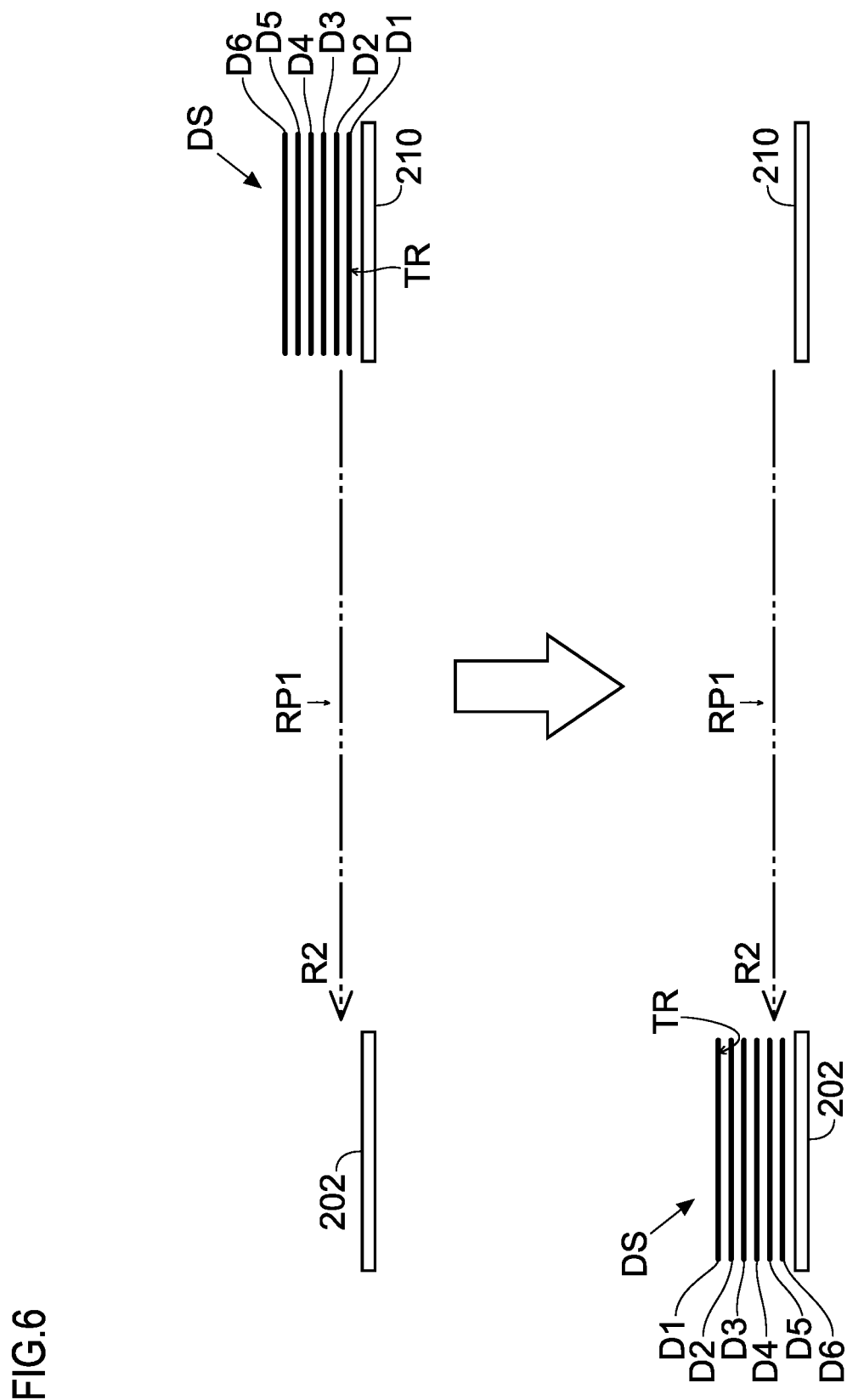
FIG. 6 is a diagram showing a state of a plurality of sheets of a document set in the document conveying unit according to the embodiment of the present invention and a state of the plurality of sheets of the document discharged from the document conveying unit (in a case where a second conveying path is used).

Now, a description will be given taking, as an example, a case where the document D includes six sheets to be read. In the following description, a first page sheet of the document D is denoted with a sign D1, a second page sheet of the document D is denoted with a sign D2, a third page sheet of the document D is denoted with a sign D3, a fourth page sheet of the document D is denoted with a sign D4, a fifth page sheet of the document D is denoted with a sign D5, and a sixth page sheet of the document D is denoted with a sign D6. The stack including the document sheets D1, D2, D3, D4, D5 and D6 is denoted with a sign DS. A reading-target side is denoted with a sign TR. In FIGS. 5 and 6, the reading-target side of the document sheet D1 is denoted with a reference sign TR. In the figures, although the sign TR to the reading-target sides of the document sheets D2 to D6 is omitted, the reading-target sides of the document D2 to D6 all face the same direction as the reading-target side of the document sheet D1.

In the single-sided reading performed in a conveyed-document reading job in the first mode, by setting the document D on the first document tray 210 with the reading-target sides thereof facing upward, reading of the reading-target side (a first side) of the document D is performed. Thus, in the single-sided reading of a conveyed-document reading job in the first mode, in a case where the document sheets D1 to D6 are reading targets, the user sets the document stack DS in a state shown in an upper diagram of FIG. 5 on the first document tray 210. The document sheets D1, D2, D3, D4, D5 and D6 are stacked one on another in this order from top to bottom (the first page of the document D being arranged at the top). The reading-target sides TR of the document sheets D1 to D6 each face upward.

In a case where a conveyed-document reading job in the first mode is executed in the state shown in the upper diagram of FIG. 5, as shown in a lower diagram of FIG. 5, the document sheets D1 to D6 are discharged onto the first discharge tray 201 in the correct order and facing the correct direction. Specifically, the document sheets D1, D2, D3, D4, D5 and D6 are stacked in this order from bottom to top. The reading target sides TR of the document sheets D1 to D6 each face downward. That is, the document stack DS is maintained in the same state as at the time of its setting.

In the single-sided reading performed in a conveyed-document reading job in the second mode, by setting the document D on the first document tray 210 with the reading-target side thereof facing downward, reading of the reading-target side (a second side) of the document D is performed. Thus, in the single-sided reading of a conveyed-document reading job in the second mode, in a case where the document sheets D1 to D6 are the reading targets, the user sets the document stack DS in a state shown in an upper diagram of FIG. 6 on the first document tray 210. The document sheets D1, D2, D3, D4, D5 and D6 are stacked in this order from bottom to top (the last page of the document D being arranged at the top). The reading-target sides TR of the document sheets D1 to D6 each face downward.

Here, in the second mode, as in the first mode, the document sheets of the document D on the first document tray 210 are sequentially fed one by one starting from the uppermost one. However, in contrast to the first mode in which the document D is discharged by being turned upside down, in the second mode, the document D is discharged without being turned upside down.

Thus, in a case where conveyed-document reading job in the second mode is executed in the state shown in the upper diagram of FIG. 6, the document stack DS discharged onto the second discharge tray 202 is not in the same state as when it is set. Specifically, as shown in a lower diagram of FIG. 6, the document sheets D1, D2, D3, D4, D5 and D6 are stacked in this order from top to bottom. The document sheets D1 to D6 each has its reading-target side TR facing downward.

In the state shown in the lower diagram of FIG. 6, there is a need for an operation of rearranging the plurality of sheets of the document D (D1 to D6) to be performed after they are taken out of the second discharge tray 202. The operation is troublesome to the user.

Further, in a conveyed-document reading job in the first mode (a job in which the document D is conveyed along the first conveying path R1 which curves into a U-shape), in a case where the document D as the target of reading is of the specific type such as thick paper, a plastic card, or the like, a problem is likely to occur in the conveyance of the document D.

For example, a fold is more likely to be formed in the document D as compared with in a conveyed-document reading job in the second mode (a job in which the document D is conveyed along the second conveying path R2 which is substantially straight). There may even be a case where the document D is bent. That is, the document D is likely to be damaged.

Further, the stiffness of the document D prevents smooth conveyance of the document D. As a result, there may be a delay in the conveyance of the document D to the reading position, which may cause a reading failure (degradation of read image quality) with part of the document D failing to be read. Moreover, a jam becomes likely to occur.

Thus, before executing a conveyed-document reading job, the control portion 4 determines whether or not a warning condition is satisfied. If the warning condition is satisfied, the control portion 4 causes the operation panel 6 to display a message MS (see FIGS. 8 to 10) to the user before executing the conveyed-document reading job.

Figure 7:
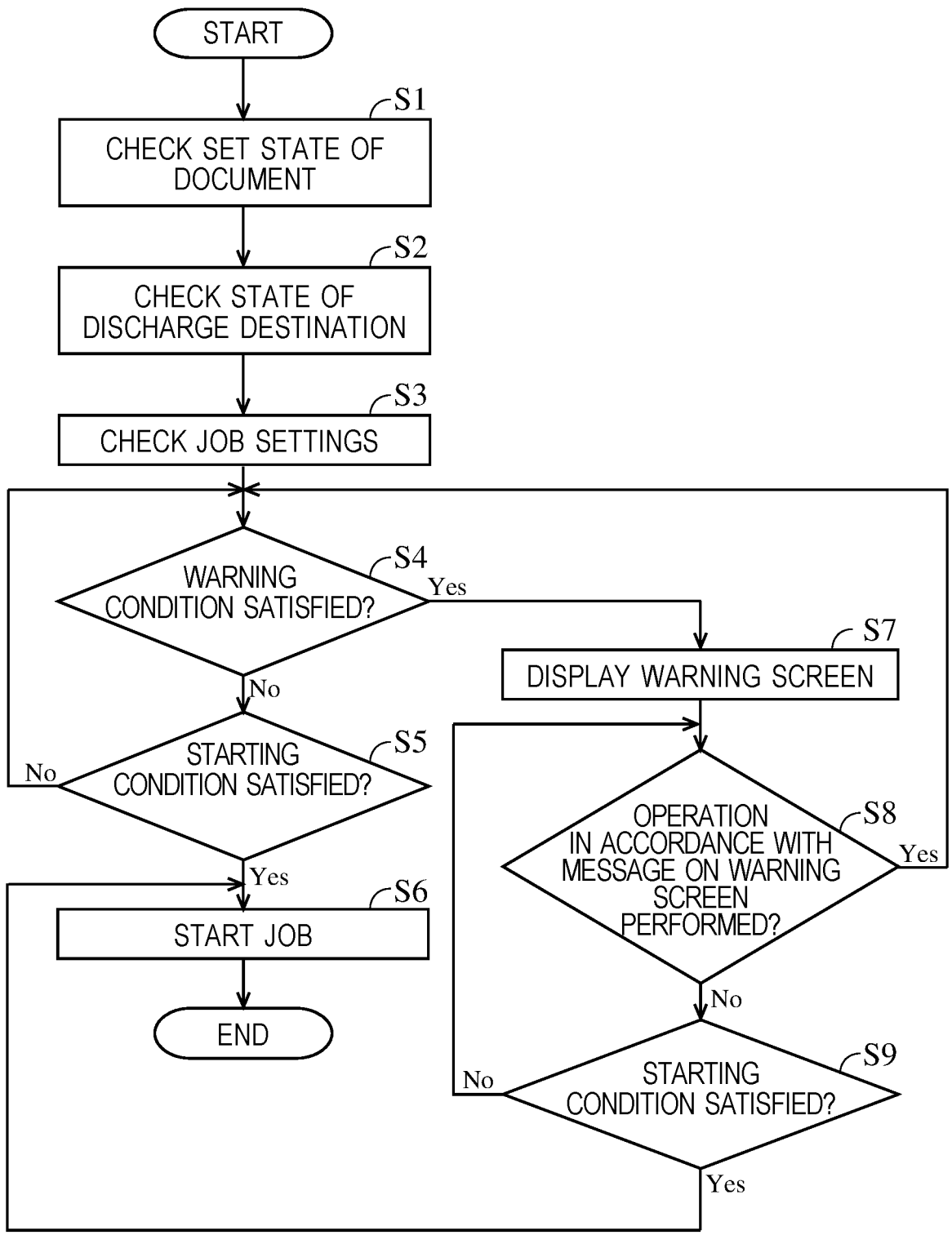
FIG. 7 is a flow chart showing a flow of a process performed by the multifunction peripheral according to the embodiment of the present invention before executing a job.

Hereinafter, with reference to a flow chart shown in FIG. 7, a description will be given of a flow of a process that the control portion 4 performs before executing the conveyed-document reading job. The flow shown in FIG. 7 starts when the control portion 4 determines that the user is performing a preparation operation for a conveyed-document reading job. For example, when the document D is set on the first document tray 210, the control portion 4 determines that the preparation operation for a conveyed-document reading job is being performed. Also when the second discharge tray 202 is opened (when the discharge port 20C is opened), the control portion 4 determines that the preparation operation for a conveyed-document reading job is being performed. Also when the operation panel 6 accepts a setting operation for a conveyed-document reading job from the user (when the operation panel 6 displays a setting screen for a conveyed-document reading job), the control portion 4 determines that the preparation operation for a conveyed-document reading job is being performed.

In step S1, the control portion 4 checks a set state of the document D based on the output of the set sensor SS. In other words, the control portion 4 checks whether or not a job document D, which is the document D to be conveyed and read in the conveyed-document reading job, is set on the first document tray 210.

In step S2, the control portion 4 checks a state of a discharge destination of the document D. Specifically, based on the output of the cover sensor CS, the control portion 4 checks the open/closed state of the second discharge tray 202. In other words, the control portion 4 checks whether or not the discharge port 20C is closed (whether or not the second discharge tray 202 is closed). Further, based on the output of the first discharge sensor ES1, the control portion 4 checks whether or not the document D is left on the first discharge tray 201. Further, based on the output of the second discharge sensor ES2, the control portion 4 checks whether or not the document D is left on the second discharge tray 202.

In step S3, the control portion 4 checks settings for the conveyed-document reading job that the operation panel 6 has accepted from the user. The control portion 4 checks the path setting and the type setting.

Specifically, the control portion 4 checks which of the first conveying path R1 and the second conveying path R2 is set to be used in the settings that the operation panel 6 has accepted. In other words, the control portion 4 checks which of the first mode and the second mode is set as the mode in which to execute the conveyed-document reading job in the settings that the operation panel 6 has accepted.

For example, when accepting the path setting, the operation panel 6 accepts from the user a mode selecting operation of selecting either one of the first mode and the second mode. The control portion 4 determines that there has been accepted a setting to the effect that the conveyed-document reading job is to be executed in the mode selected in the mode selecting operation. In a case where no mode selecting operation has been performed, the control portion 4 determines that there has been accepted a setting to the effect that the conveyed-document reading job is to be executed in the first mode, which is a default mode.

The control portion 4 also checks which of a prescribed plurality of types has been set as the type of the job document D. And the control portion 4 recognizes a thickness (a basis weight) associated with the set type of the plurality of types as the thickness of the job document D.

For example, when accepting a type setting, the operation panel 6 accepts from the user a type selecting operation of selecting any of the plurality of types. The control portion 4 recognizes the thickness (the basis weight) associated with the type selected in the type selecting operation as a thickness of the job document D. In a case where no type selecting operation has been performed, the control portion 4 recognizes that the job document D is of the plain paper type (a default type).

In step S4, the control portion 4 determines whether or not a warning condition is satisfied. Hereinafter, processing performed in step S4 will be described in detail.

In a case where the document D to be read in a conveyed-document reading job includes a plurality of sheets, in the first mode, a state of a stack of the plurality of sheets of the document D does not change before and after the job (see FIG. 5). On the other hand, in the second mode, the state of the stack of the plurality of sheets of the document D changes before and after the job (see FIG. 6).

Thus, to omit the operation of rearranging the discharged plurality of sheets of the document D, it is preferable that the conveyed-document reading job be executed in the first mode. However, if the document D to be read in a conveyed-document reading job in the first mode is of the specific type, the document D is likely to be damaged. If the document D is of the plain paper type, even if a conveyed-document reading job is executed in the first mode, the document D is unlikely to be damaged. Further, even if the document D is of the specific type, if a conveyed-document reading job is executed in the second mode, damage to the document D is suppressed.

Thus, when the job document D is of the plain paper type, if a setting has been made to the effect that the second conveying path R2 is to be used, the control portion 4 determines that a first condition as the warning condition is satisfied. If the job document D is of the specific type, even if a setting has been made to the effect that the second conveying path R2 is to be used, the control portion 4 determines that the first condition is not fulfilled. Further, when the job document D is of the plain paper type, if a setting has been made to the effect that the first conveying path R1 is to be used, the control portion 4 determines that the first condition is not satisfied.

Here, if a setting has been made to the effect that the second conveying path R2 is to be used, the control portion 4 may determine that the first condition is satisfied, regardless of the type of the job document D.

Further, the control portion 4 determines whether or not there is a possibility that a problem may occur in the conveyance of the document D if the conveyed-document reading job is executed as it is set. Then, if there is a possibility that a problem may occur in the conveyance of the document D, the control portion 4 determines that a second condition as the warning condition is satisfied.

Specifically, when the job document D is of the specific type, if the first conveying path R1 is used as the conveying path for the job document D, there is a possibility that damage to the job document D, failure in reading the job document D, a jam of the job document D, etc. may occur. Thus, when the job document D is of the specific type, if a setting has been made to the effect that the first conveying path R1 is to be used, the control portion 4 determines that the second condition is satisfied. Even when a setting has been made to the effect that the first conveying path R1 is to be used, if the job document D is not of the specific type, the control portion 4 determines that the second condition is not satisfied.

Further, the control portion 4 determines, based on the state of the discharge destination of the document D, whether or not a third condition as the warning condition is satisfied.

Specifically, when a setting has been made to the effect that the first conveying path R1 is to be used, if the document D is left on the first discharge tray 201, the control portion 4 determines that the third condition is satisfied. Further, when a setting has been made to the effect that the second conveying path R2 is to be used, if the discharge port 20C is closed by the second discharge tray 202, that is, if the second discharge tray 202 is closed, the control portion 4 determines that the third condition is satisfied. Further, when a setting has been made to the effect that the second conveying path R2 is to be used, even if the discharge port 20C is not closed by the second discharge tray 202, if the document D is left on the second discharge tray 202, the control portion 4 determines that the third condition is satisfied.

In a case where, in step S4, the control portion 4 has determined that the warning condition is not satisfied, the flow proceeds to step S5. In step S5, the control portion 4 determines whether or not a starting condition for starting the conveyed-document reading job is satisfied. On detecting an operation performed with respect to the start button on the operation panel 6, the control portion 4 determines that the starting condition for starting the conveyed-document reading job is satisfied.

Here, before the operation with respect to the start button on the operation panel 6, the user performs the preparation operation for the conveyed-document reading job. The preparation operation for a conveyed-document reading job includes, for example, an operation of setting the document D on the first document tray 210, an operation of rotating the second discharge tray 202 to open the sheet feed port 20C (an operation of opening the second discharge tray 202), an operation of removing the document D left on the first discharge tray 201, an operation of removing the document D left on the second discharge tray 202, and an operation, with respect to the operation panel 6, of making settings for the conveyed-document reading job.

In a case where the control portion 4 has determined that the starting condition for starting the conveyed-document reading job is satisfied in step S5, the flow proceeds to step S6. In step S6, the control portion 4 starts the conveyed-document reading job.

In a case where the control portion 4 has determined that the starting condition for starting the conveyed-document reading job is not satisfied in step S5, the flow returns to step S4. Here, even if no message MS is displayed, before the conveyed-document reading job is started, the user may perform an operation of changing the settings for the conveyed-document reading job. Thus, there may be a case where, even when the warning condition is not satisfied at the time point when the flow proceeds from step S3 to step S4, the warning condition is satisfied at the time point when the flow returns to step S4 from step S5.

Figure 8:
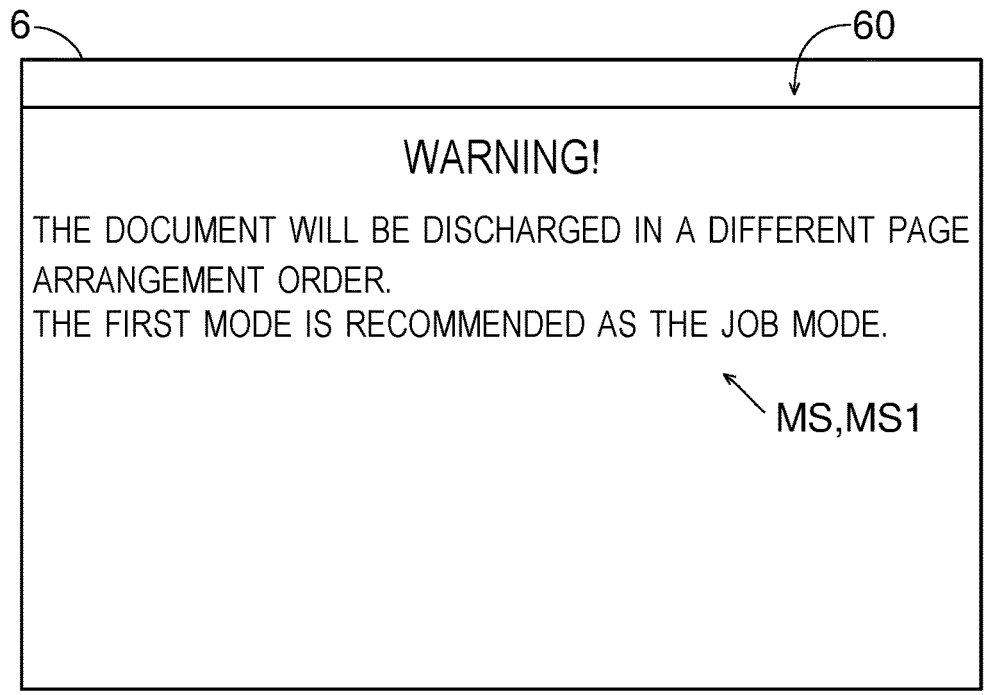
FIG. 8 is a diagram showing a first warning message displayed by the multifunction peripheral according to the embodiment of the present invention.
Figure 9:
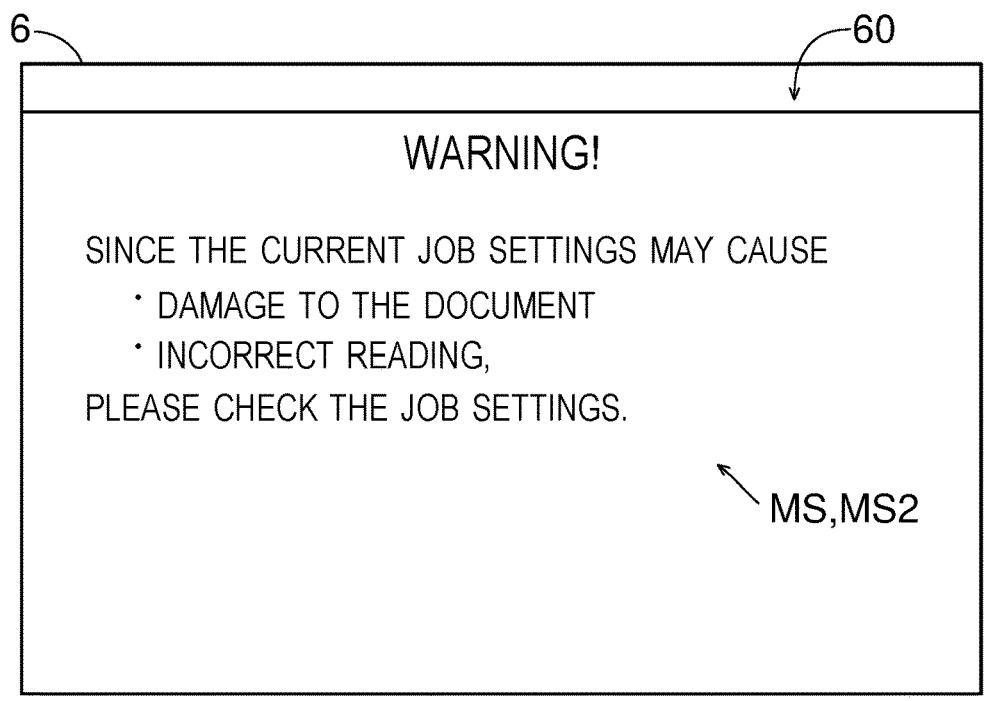
FIG. 9 is a diagram showing a second warning message displayed by the multifunction peripheral according to the embodiment of the present invention.
Figure 10:
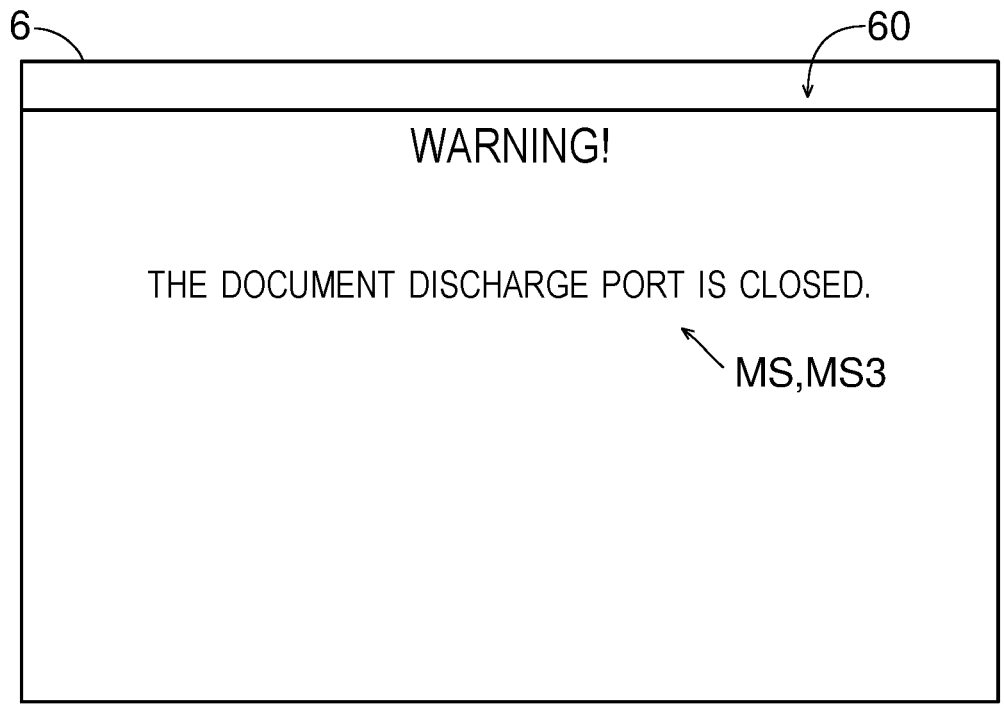
FIG. 10 is a diagram showing a third warning message displayed by the multifunction peripheral according to the embodiment of the present invention.

In step S4, in a case where the control portion has determined that the warning condition is satisfied, the flow proceeds to step S7. In step S7, the control portion 4 causes the operation panel 6 to display a warning screen 60 as shown in FIGS. 8 to 10. On the warning screen 60, a message MS is arranged. Hereinafter, the message MS shown in FIG. 8 will be referred to as a first warning message MS1, the message MS shown in FIG. 9 will be referred to as a second waning message MS2, and the message MS shown in FIG. 10 will be referred to as a third warning message MS3, whereby the messages MS are distinguished from each other.

The first warning message MS1 shown in FIG. 8 corresponds to a "warning message". That is, the first warning message MS1 is a message regarding a page arrangement order of the job document D after it is discharged. The first warning message MS1 is displayed in a case where the first condition as the warning condition is satisfied.

If the job document D is of the plain paper type and a setting has been made to the effect that the second conveying path R2 is to be used, the first condition is satisfied. Here, if the job document D is of the plain paper type, even if the first conveying path R1 is used, there is only a low possibility of damage to the job document D. Further, if the first conveying path R1 is used, there is no need of the operation of rearranging the discharged job document D. Thus, when the job document D is of the plain paper type, if a setting has been made to the effect that the second conveying path R2 is to be used, the control portion 4 causes a message that recommends using the first conveying path R1 to be included in the first waring message MS1. For example, included in the first warning message MS1 is a message that recommends the first mode as the mode in which to execute the conveyed-document reading job.

The second waning message MS2 shown in FIG. 9 is a message to the effect that there is a possibility that a problem may occur in the conveyance of the job document D. The second waning message MS2 is displayed in a case where the second condition as the warning condition is satisfied.

If the job document D is of the specific type and a setting has been made to the effect that the first conveying path R1 is to be used, the second condition is satisfied. In the second waning message MS2 displayed when the second condition is satisfied, there are included a message to the effect that damage may be caused to the job document D, a message to the effect that the job document D may fail to be read correctly, and the like. Further, in the second waning message MS2, there is included a message that urges the user to check the settings for the conveyed-document reading job.

The third waring message MS3 shown in FIG. 10 is a message regarding the state of the discharge destination. The third waring message MS3 is displayed in a case where the third condition as the warning condition is satisfied.

When a setting has been made to the effect that the second conveying path R2 is to be used, if the discharge port 20C is closed by the second discharge tray 202, the third waring message MS3 shown in FIG. 10 is displayed on the operation panel 6. For example, a message to the effect that the discharge port 20C is closed is displayed as the third waring message MS3.

Further, although not illustrated, when a setting has been made to the effect that the first conveying path R1 is to be used, if the document D is left on the first discharge tray 201, a message to the effect that the document D is left on the first discharge tray 201 is displayed as the third waring message MS3. When a setting has been made to the effect that the second conveying path R2 is to be used, if the document D is left on the second discharge tray 202, a message to the effect that the document D is left on the second discharge tray 202 is displayed as the third waring message MS3.

Here, although not illustrated, in a case where the document D is not set on the first document tray 210, the warning screen 60 is displayed in which is arranged a message that urges the user to check the set state of the document D. That is, in step S4, the control portion 4 determines whether or not the document D is set on the first document tray 210. Then, if the document D is not set, the control portion 4 determines that the warning condition is satisfied.

Referring back to FIG. 7, after the warning screen 60 is displayed, the flow proceeds to step S8. Here, after checking the warning screen 60, the user takes a measure if necessary.

For example, in a case where the first warning message MS1 as shown in FIG. 8 is displayed, the user reviews the job settings, and change the conveyance path for the job document D from the second conveying path R2 to the first conveying path R1. Further, the user turns the document D set on the first document tray 210 upside down (such that the reading-target side of the job document D faces upward). In a case where the set state of the document D is as shown in the upper diagram of FIG. 6, it is changed to the set state shown in the upper diagram of FIG. 5.

In a case where the second warning message MS2 as shown in FIG. 9 is displayed, the user reconsiders the job settings, and changes the conveyance path for the job document D from the first conveying path R1 to the second conveying path R2. Further, the user turns the document D set on the first document tray 210 upside down (such that the reading-target side of the job document D faces downward).

In a case where the third waring message MS3 as shown in FIG. 10 is displayed, the user rotates the second discharge tray 202 from the closing position to the opening position to open the discharge port 20C. That is, the state shown in FIG. 2 is achieved. Although not illustrated, in a case where the third warning message MS3 to the effect that the document D is left on the first discharge tray 201 is displayed, the user removes the document D from the first discharge tray 201. In a case where the third warning message MS3 to the effect that the document D is left on the second discharge tray 202 is displayed, the user removes the document D from the second discharge tray 202.

Although not illustrated, in a case where the warning screen 60 is displayed in which is arranged the message that urges the user to check the set state of the document D, the user sets the document D on the first document tray 210.

In this manner, in the case where the warning screen 60 is displayed on the operation panel 6, the user performs an operation in accordance with the message on the warning screen 60 which is being displayed. When the control portion 4 detects that the operation in accordance with the message on the warning screen 60 has been performed, the flow returns to step S4. The control portion 4 checks again whether or not the warning condition is satisfied.

In a case where, in step S8, the control portion 4 has determined that the operation in accordance with the message on the warning screen 60 has not been performed, the flow proceeds to step S9. In step S9, the control portion 4 determines whether or not the starting condition for starting the conveyed-document reading job is satisfied. The processing performed in step S9 is similar to the processing performed in step S5. In a case where the control portion 4 has determined that the starting condition is satisfied, the flow returns to step S6. On the other hand, in a case where the control portion 4 has determined that the starting condition is not satisfied, the flow returns to step S8.

Note that, this feature allows the user to start the conveyed-document reading job even without performing the operation corresponding to the message displayed on the warning screen 60. However, alternatively, the conveyed-document reading job may be prohibited from being started if the operation in accordance with the message displayed on the warning screen 60 is not performed. That is, the processing in step S8 may be repeated until the operation in accordance with the message on the warning screen 60 is performed.

In the present embodiment, as described above, if a setting has been made to the effect that the second conveying path R2 is to be used, before execution of a conveyed-document reading job, the control portion 4 causes the operation panel 6 to display the first warning message MS1 regarding the page arrangement order of the job document D after it is discharged. This helps the user to recognize that the stack of the plurality of sheets of the document D will be in the state as shown in the lower diagram of FIG. 6. In other words, this helps the user to recognize that he or she will need to rearrange the plurality of sheets of the document D after they are discharged. This is convenient to the user, who wishes to avoid the rearranging operation, because this allows the user to reconsider the settings for the conveyed-document reading job.

Here, when the job document D is of the plain paper type, even if the first conveying path R1 is used, there is only a low possibility of damage to the job document D. On the other hand, when the job document D is of the specific type, if the first conveying path R1 is used, the job document D is likely to be damaged.

Thus, according to the present embodiment, as described above, when the job document D is of the plain paper type and a setting has been made to the effect that the second conveying path R2 is to be used, the control portion 4 causes the first warning message MS1 to be displayed. On the other hand, when the job document D is of the specific type which is not the plain paper type, even if a setting has been made to the effect that the second conveying path R2 is to be used, the control portion 4 does not cause the first warning message MS1 to be displayed. Thereby, when the job document D is of the specific type, it is possible to prevent the conveyance path for the job document D from being changed from the second conveying path R2 to the first conveying path R1. That is, damage to the job document D can be suppressed.

Further, according to the present embodiment, as described above, the control portion 4 causes a message that recommends using the first conveying path R1 to be included in the first warning message MS1. This helps the user to easily recognize which setting item should be changed.

Further, in the present embodiment, when the job document D is of the plain paper type and a setting has been made to the effect that the first conveying path R1 is to be used, the control portion 4 does not cause the first warning message MS1 to be displayed. This helps prevent unnecessary display of the first warning message MS1.

Further, in the present embodiment, when the job document D is of the specific type, which is not plain paper, if a setting has been made to the effect that the first conveying path R1 is to be used, the control portion 4, before executing a conveyed-document reading job, causes the operation panel 6 to display the second warning message MS2 to the effect that a problem may occur in the conveyance of the job document D. When the second waning message MS2 is displayed, the user reconsiders the job settings. That is, the conveying path for the job document D is changed from the first conveying path R1 to the second conveying path R2. This helps suppress damage to the job document D. Further, this helps suppress occurrence of reading failure. Furthermore, this helps make it less likely for a jam of the job document D to occur.

Further, in the present embodiment, as described above, when a setting has been made to the effect that the second conveying path R2 is to be used, if the second discharge tray 202 is closed, the control portion 4, before executing a conveyed-document reading job, causes the operation panel 6 to display the third warning message MS3 that urges the user to check the discharge destination of the job document D. This helps the user to recognize that the conveyed-document reading job cannot be executed (that the discharge port 20C through which to discharge the job document D is closed). On reading the third waring message MS3, the user opens the second discharge tray 202 to achieve a state in which the conveyed-document reading job can be executed.

Note that, also in a case where the document D is left on the first discharge tray 201, the third waring message MS3 is displayed. Further, also in a case where the document D is left on the second discharge tray 202, the third waring message MS3 is displayed. When the user reads the thus displayed third waring message MS3, before the conveyed-document reading job is started, the document D that has been discharged is removed. This helps suppress mixing of the document D read in one job with the document D read in another job.

It should be understood that the embodiment disclosed herein is an example in all aspects and does not limit the implementation of the present invention in any way. The scope of the present invention is indicated not by the above description of the embodiment but by the scope of claims for patent, and all changes and modifications within the meaning and scope equivalent to the scope of claims for patent are intended to be included.

For example, according to the above embodiment, the second conveying path R2 passes the first position RP1, but this is not meant to limit the present invention, and a conveying path that passes the second position RP2 may be the second conveying path. In the structure according to the modified example, the second position RP2 corresponds to a "predetermined reading position". Further, the reading portion 1 corresponds to a "predetermined reading portion".

Hereinafter, with reference to FIGS. 11 and 12, a description will be given of the structure of the modified example. Note that the modified example is similar to the above embodiment in basic structure. Thus, in the following description, components common in both the above embodiment and the modified example are denoted by the same names and the same signs, and overlapping descriptions thereof will be omitted.

According to the modified example, the document conveying unit 200 includes a document conveying path 20' that guides the conveyance of the document D to be read in a conveyed-document reading job. The document conveying unit 200 further includes a second document tray 220. The second document tray 220 is located on the left side as seen from the front of the multifunction peripheral 100. According to the modified example, the document conveying unit 200 does not include the second discharge tray 202.

On the first document tray 210, the document D to be read in a conveyed-document reading job in the first mode is set. On the second document tray 220, the document D to be read in a conveyed-document reading job in the second mode is set. In the modified example, the first document tray 210 and the second document tray 220 each correspond to a "set portion".

In a conveyed-document reading job (single-sided reading) in the first mode, the document conveying unit 200 feeds the document D set on the first document tray 210 via the sheet feed port 20A through which to feed the document D from the first document tray 210 into the document conveying path 20'. Then, the document conveying unit 200 conveys the document D which has been fed, and discharges the document D onto the first discharge tray 201. Of the document D discharged onto the first discharge tray 201, the first side faces downward and the second side faces upward. Further, the reading portion 1 reads the first side of the document D at the second position RP2. That is, the job is performed in a manner similar to in the embodiment described above.

In a conveyed-document reading job in the second mode, the document conveying unit 200 feeds the document D set on the document tray 220 via a sheet feed port 20D through which to feed the document D from the document tray 220 into the document conveying path 20'. Then, the document conveying unit 200 conveys the document D which has been fed, and discharges the document D onto the first discharge tray 201. Of the document D discharged onto the first discharge tray 201, the first side faces upward and the second side faces downward. Further, the reading portion 1 reads the second side of the document D at the second position RP2.

In the following description, of the two conveying paths through which the document D is conveyed by the document conveying unit 200, a conveying path for the first mode will be referred to as the first conveying path R1', and a conveying path for the second mode will be referred to as the second conveying path R2'. The first conveying path R1' and the second conveying path R2' are shown in FIG. 12. In FIG. 11, neither the first conveying path R1' nor the second conveying path R2' is illustrated.

The first conveying path R1' of the modified example is similar to the first conveying path R1 of the embodiment described above. The second conveying path R2' of the modified example extends from the left side toward the right side. The second conveying path R2' of the modified example, as the second conveying path R2 of the above-described embodiment, does not turn back midway toward the reverse side.

Figure 11:
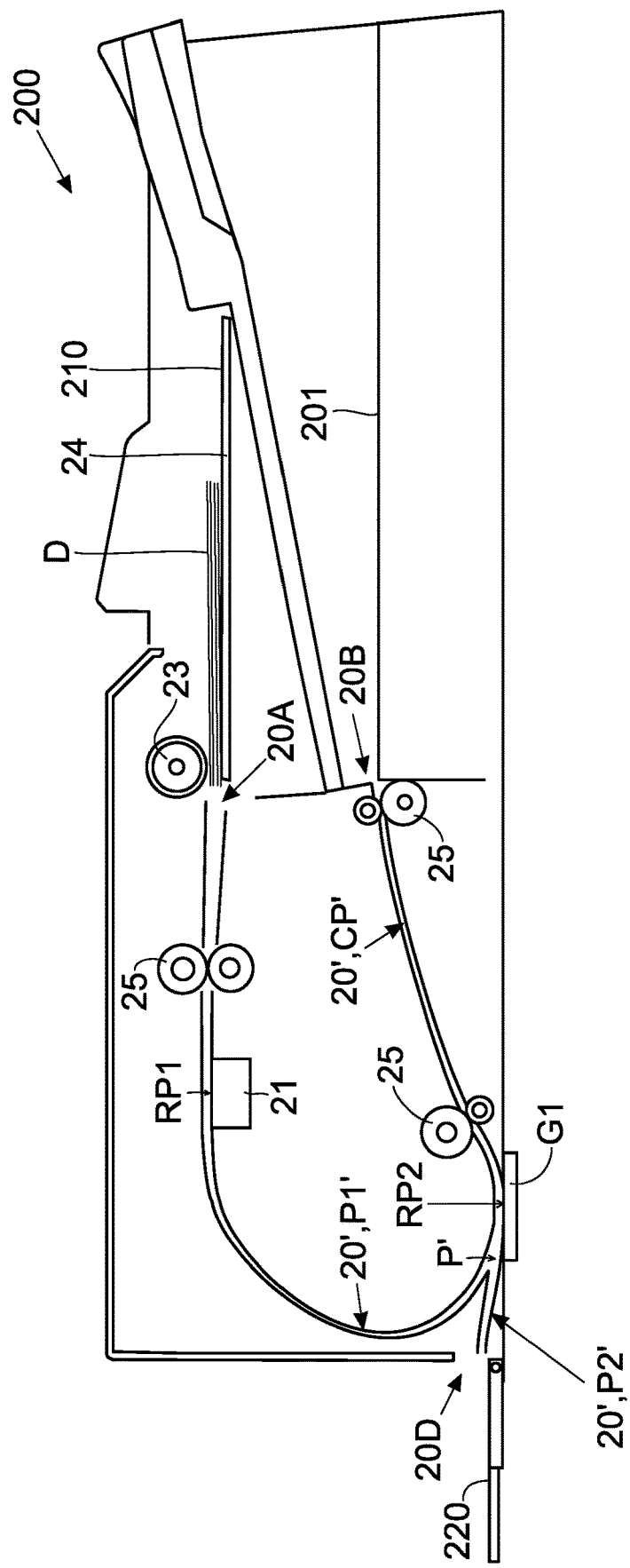
FIG. 11 is a schematic diagram of a document conveying unit according to a modified example of the present invention.
Figure 12:
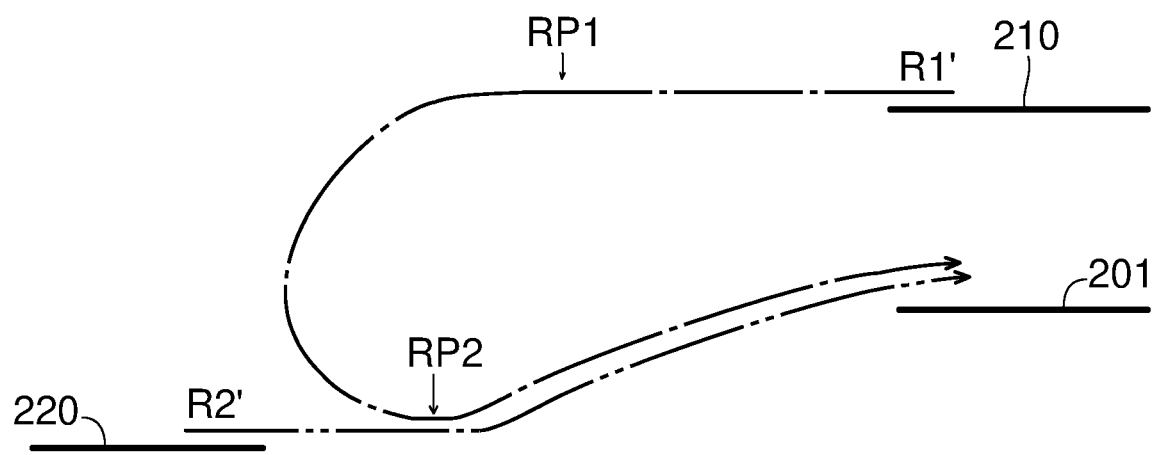
FIG. 12 is diagram showing a conveying path for a document conveyed by the document conveying unit according to the modified example of the present invention.

As shown in FIG. 11, the document conveying path 20' includes a first part P1' and a second part P2'. Further, the document conveying path 20' includes a common part C'. The common part CP' is a part extending from a joint position P' to the discharge port 20B in the document conveying path 20'. The first part P1' is a part extending from the sheet feed port 20A to the joint position P'. The second part P2' is a part extending from the sheet feed port 20D to the joint position P'. The conveying path for the document D extending from the first document tray 210, via the first part P1' and the common part CP', to the first discharge tray 201 is the first conveying path R1'. The conveying path for the document D extending from the second document tray 220, via the second part P2' and the common part CP', to the first discharge tray 201 is the second conveying path R2'.

In the modified example, in a case where a plurality of sheets of the document D (a stack of the document D) set on the second document tray 220 is the target of reading in a conveyed-document reading job in the second mode, an inconvenience occurs that is similar to the inconvenience that occurs in the embodiment described above. That is, the operation of rearranging the plurality of sheets of the document D needs to be performed.

Thus, in the modified example, as in the embodiment described above, when the job document D is of the plain paper type, if a setting has been made to the effect that the second conveying path R2' is to be use, the control portion 4 determines that the first condition as the warning condition is satisfied. When the job document D is of the specific type, even if a setting has been made to the effect that the second conveying path R2' is to be used, the control portion 4 determines that the first condition is not satisfied. Further, when the job document D is of the plain paper type, if a setting has been made to the effect that the first conveying path R1' is to be used, the control portion 4 determines that the first condition is not satisfied.

In a case where the first condition is satisfied, the control portion 4 causes the operation panel 6 to display the first warning message regarding the page arrangement order of the job document D after it is discharged. At this time, the control portion 4 causes a message that recommends using the first conveying path R1' to be included in the first warning message.

Further, in the modified example, the first conveying path R1' extends from the right side toward the left side and turns back midway toward the right side, as the first conveying path R1 in the embodiment described above. In the modified example, the second conveying path R2' does not turn back midway, as the second conveying path R2' in the embodiment described above. Thus, in a case where the document D to be read in a conveyed-document reading job is of the specific type, it is preferable to execute the conveyed-document job not in the first mode using the first conveying path R1', but in the second mode using the second conveying path R2'.

Thus, in the modified example, as in the embodiment described above, when the job document D is of the specific type, if a setting has been made to the effect that the first conveying path R1' is to be used, the control portion 4 determines that the second warning condition as the warning condition is satisfied. Even when a setting has been made to the effect that the first conveying path R1' is to be used, if the job document D is not of the specific type, the control portion 4 determines that the second condition is not satisfied. In a case where the second condition is satisfied, the control portion 4 causes the operation panel 6 to display the second warning message to the effect that a problem may occur in the conveyance of the job document D.

Further, in the modified example, the control portion 4 determines whether or not the third condition as the warning condition is satisfied based on the state of the first discharge tray 201 (the discharge destination of the document D). In the modified example, both in the first mode and in the second mode, the document D is discharged onto the first discharge tray 201. Thus, if the document D is left on the first discharge tray 201, the control portion 4 determines that the third condition is satisfied, regardless of whether the conveying path for the job document D is the first conveying path R1' or the second conveying path R2'. In a case where the third condition is satisfied, the control portion 4 causes the operation panel 6 to display the third warning message to the effect that the document D is left on the first discharge tray 201.

The invention claimed is:

1. An image-reading device, comprising:
an operation panel that accepts a setting for a reading job of reading a document to generate image data;
a document conveying unit that has a set portion on which a job document to be read in the reading job is set, and that feeds and conveys the job document from the set portion;
a first reading portion that reads the job document under conveyance at a first position;
a second reading portion that reads the job document under conveyance at a second position; and
a control portion that controls the reading job based on a setting for the reading job accepted by the operation panel,
wherein
a conveying path for the job document includes: a first conveying path that extends from one side via the first position toward an other side, turning back midway toward the one side to pass the second position; and a second conveying path that, without turning back midway, passes a predetermined reading position, which is one of the first position and the second position;
when a plurality of sheets of the job document are set on the set portion, the document conveying unit feeds the plurality of sheets of the job document sequentially one by one starting from an uppermost sheet of the job document;
when a setting has been made to the effect that the first conveying path is to be used in the reading job in which a single side of the job document is read,
the second reading portion reads a first side of two sides of the job document, the first side facing upward in a state where the job document is set on the set portion, and
the document conveying unit discharges the job document with the first side facing downward;
when a setting has been made to the effect that the second conveying path is to be used in the reading job in which a single side of the job document is read,
a predetermined reading portion that performs reading at the predetermined reading position of the first reading position and the second reading position reads a second side of the two sides of the job document, the second side facing downward in the state where the job document is set on the set portion, and
the document conveying unit discharges the job document with the second side facing downward; and
when a setting has been made to the effect that the second conveying path is to be used, the control portion, before executing the reading job, causes the operation panel to display a warning message regarding a page arrangement order of the job document after the job document is discharged.

2. The image-reading device according to claim 1, wherein in a case where the job document is of a plain paper type and a setting has been made to the effect that the second conveying path is to be used, the control portion causes the warning message to be displayed.

3. The image-reading device according to claim 1, wherein if the job document is of a specific type, which is not plain paper, even if a setting has been made to the effect that the second conveying path is to be used, the control portion does not cause the warning message to be displayed.

4. The image-reading device according to claim 1, wherein the control portion causes a message that recommends using the first conveying path to be included in the warning message.

5. The image-reading device according to claim 1, wherein in a case where the job document is of a plain paper type and a setting has been made to the effect that the first conveying path is to be used, the control portion does not cause the warning message to be displayed.

* * * * *